Jan. 21, 1964 G. H. FUEHRER 3,118,681
SEALING RING WITH ASSEMBLY MEANS
Original Filed Feb. 27, 1961
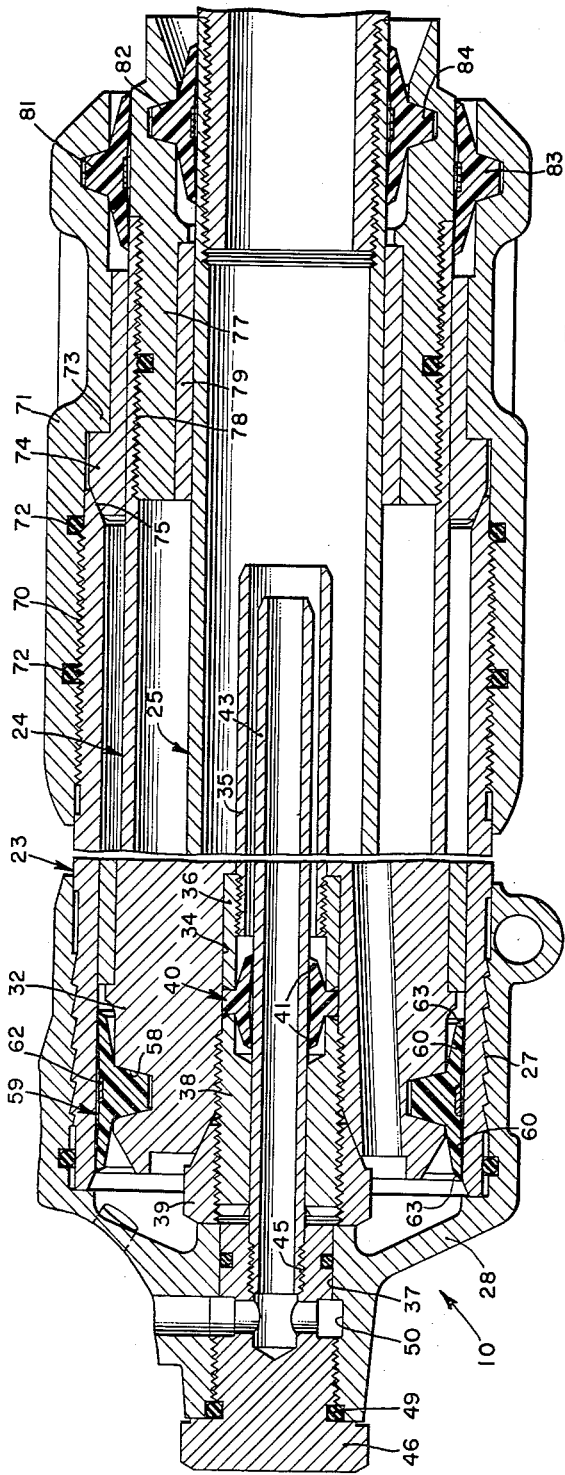
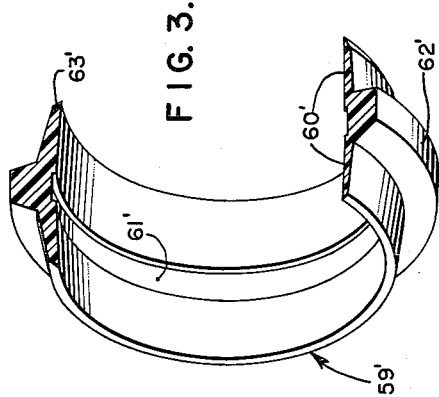
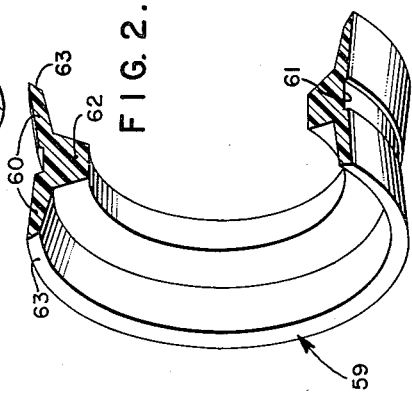
GEORGE H. FUEHRER
INVENTOR.
BY 
ATTORNEY.

United States Patent Office 3,118,681
Patented Jan. 21, 1964

3,118,681
SEALING RING WITH ASSEMBLY MEANS
George H. Fuehrer, Downey, Calif., assignor to Thor Power Tool Company, Aurora, Ill., a corporation of Delaware
Continuation of application Ser. No. 92,013, Feb. 27, 1961. This application May 9, 1963, Ser. No. 280,190
2 Claims. (Cl. 277—9)

This invention relates to piston rings and dirt wiper seals and more particularly to an improved one-piece piston ring having a plurality of widely-spaced resilient sealing lips projecting in opposite axial directions from a common main support ring capable of being deformed sufficiently to permit assembly of the ring within a mounting groove and capable of operating for extended periods without need for inspection or servicing.

This is a continuation of my application for U.S. Letters Patent S.N. 92,013 filed February 27, 1961, and now abandoned, for Sealing Ring Assembly.

Recent improvements in component materials and in the design and assembly of power cylinders have focused the attention of designers on the possible feasibility of eliminating provision for field disassembly and servicing of such cylinders. The need heretofor for such field servicing has been subject to many serious problems because of the unfavorable conditions often existing in the field for servicing. An equally serious factor has been the general lack of adequate facilities and trained personnel in the field skilled in proper servicing techniques.

Exemplary of problems in the use of fluid pressure operated assemblies and illustrating the problems to the solution of which this invention is directed are feed leg assemblies employed to support sinker drills and other type of power operated tools useful in drilling and breaking rock formations. Feed leg assemblies are normally constructed in two or three stages with one end supported on the ground and the other pivotally connected to the main body of the pneumatic tool. A portion of the presurized fluid supplied to operate the tool is supplied under controlled conditions to the feed leg assembly to hold it in a desired extended position. Operation of the tool subjects the feed leg assembly to severe vibration and shock conditions conducive to loosening of the fasteners holding the parts assembled. Such loosening has been accepted as inherent in the use of expandable feed legs to support pneumatic tools.

My recent invention disclosed in United States Letters Patent 2,914,031, granted November 24, 1959, entitled Telescopic Feed Leg Assembly, is directed to the use of metal bonding agents between certain of the parts to lock them rigidly and substantially permeanently assembled. The advent of this new and greatly improved technique now makes it feasible to provide sub-assemblies which cannot become disassembled in use and enabling them to operate for long periods without need for field servicing. In fact, disassembly of the bonded parts is possible only by the use of equipment available in specially equipped servicing facilities. In order to take advantage of the possibilities of the referred to sub-assemblies, it is most important that their components be capable of long trouble-free service life. The one component falling far short of meeting such long service requirements without servicing is the sealing ring or packing provided between the piston and its cylinder wall, as well as the packing provided between the piston rod and the cylinder.

To overcome the inadequacies of the prior art sealing and packing assemblies of which there are a great variety is the principal purpose and objective of the present invention. These objectives have been satisfied to an unusually gratifying degree by the construction illustrated and described below. Whether used between the piston and the cylinder wall or between the outer end of the cylinder and the piston rod, the seal of this invention is made in one homogeneous unit of resilient material capable of being stretched and expanded sufficiently for assembly over a one-piece piston. To facilitate the assembly operation one rim edge of the piston is deeply beveled to provide a pilot and expander for the seal which is characterized by the provision of a centrally disposed thick-walled main body ring having relatively wide thin-walled flexible sealing lips extending in opposite directions from the side walls thereof. These lips diverge from the main body ring at a very acute angle with their remote rim edges designed for light pressure contact with a relatively movable cylindrical surface and cooperating therewith to provide a highly reliable seal. Preferably, the opposite side walls of the main body converge away from the base of the sealing lips and cooperate with complementally shaped side walls of a seating groove to support the ring in its proper operating relation with respect to the surface to be sealed. To assure forming a seal across substantial pressure differences, as is essential when used as a piston sealing ring, the seal is further characterized by the provision of a shallow axially-wide seating groove for a keeper ring of metal or the like. This ring is positioned midway between the root ends of sealing lips and has a diameter slightly smaller than the diameter of the metal surface against which the lips seal. The keeper ring cooperates with the main body and the seating groove therefor to hold the seal securely within its supporting groove despite very considerable pressure differentials which may exist between the opposite ends of the piston on which the ring is mounted. The keeper ring usually is not necessary if the seal is used as a dirt wiper seal between the cylinder and the piston rod, since there is seldom any appreciable pressure difference across the seal in this application; if there is, the use of a keeper ring is desirable.

Accordingly, it is a primary object of the present invention to provide an improved unitary sealing ring having multiple sealing lips and characterized by its unusually long trouble-free service life.

Another object of the invention is the provision of a unitary sealing ring characterized by a relatively thick, heavy main body portion and integral oppositely-extending flexible sealing lips.

Another object of the invention is the provision of a dust wiper seal for use between the outer end of a cylinder and a concentrically related piston rod having a pair of sealing lips widely spaced from one another axially of the piston rod.

Another object of the invention is the provision of an improved piston and sealing ring assembly comprising a one-piece ring of resilient material and a continuous high strength retainer ring cooperable therewith to lock the resilient member assembled within a supporting mounting groove of a one-piece piston, the retainer ring being equally effective irrespective of whether the main body of the sealing ring faces inwardly or outwardly with respect to a cooperating cylindrical surface.

FIGURE 1 is a longitudinal sectional view taken through a feed leg assembly with portions thereof broken away and illustrating a typical application of sealing rings embodying the present invention;

FIGURES 2 and 3 are fragmentary perspective views of the invention, the FIGURE 2 form being suitable for mounting on a piston and the FIGURE 3 form being suitable for mounting for sealing engagement with a piston rod.

Referring to the drawings and more particularly to FIGURE 1, it is pointed out that the typical operating environment for the invention there illustrated comprises a sinker drill feed leg assembly of the type disclosed in application for United States Letters Patent Serial No. 89,985, filed March 21, 1961, by George H. Fuehrer and Wolfrom G. Korff, and assigned to the same assignee as the present application. It is emphasized however that the sealing ring construction to be disclosed in detail below is equally suitable for use in other fluid-operated assemblies generally.

The expandable-contractable cylinder assembly incorporating the present invention and designated generally 10 is especially designed for use to support and advance a pneumatically operated tool suitable for drilling rock and the like operations. Reference may be had to the above-identified application for a fuller description of the constructional details and their mode of operation. An understanding of the principles of the present invention and of its mode of use will be had from the following description of the pneumatically operated cylinder assembly shown in FIGURE 1. Feed leg assembly 10 comprises a three stage cylinder assembly including a large diameter stage 23, an intermediate stage 24, and a third stage 25. The mid-sections of these stages have been omitted, as have the details of certain of the piston construction and their modes of connection with the tubular members of stages 24 and 25. However, it will be understood that the one-piece piston head 32 has a skirt (not shown) at its right hand end suitably threaded or otherwise connected to the inner end of second stage cylinder or hollow piston rod 24. Likewise, it will be understood that the left hand or inner end of third stage 25 is provided with a piston and sealing ring similar to piston 32 and having sliding, sealing contact with the interior surface of stage 24.

In the position of the parts shown in FIGURE 1, the several stages are fully collapsed together with piston 32 positioned against a stop provided by a boss projecting axially from the interior of end cap 28. This end cap is held in assembled relation to the left hand end of stage 23, as by accurately and snugly fitting threads 27.

The second or intermediate stage 24 is provided at its inner end with a one-piece aluminum piston 32 having a reduced diameter skirt (not shown) threaded onto the tubular body of stage 24. Piston 32 is provided with a shouldered bore 34, 34 extending centrally therethrough in which is mounted an open-ended air flow tube 35. The inner end of tube 35 is threaded into a mounting sleeve 36 having a snug sliding fit within bore 34. A threaded bushing 38 is mounted in the threaded outer end of bore 34 and locked securely in position by a lock nut 39 having a tapered end seating against the complementally tapered outer end of bore 34. The inner end of bushing 38 cooperates with the juxtaposed end of sleeve 36 to hold securely mounted therebetween a sealing ring 40 having a pair of similar flexible lips 41, 41.

A second and smaller air flow tube 43 is axially aligned with air tube 35 with its accurately finished exterior surface having a close sliding fit with the inner side wall of bushing 38. Lips 41 of sealing ring 40 have resilient wiping contact with air tube 43 and cooperate therewith in preventing leakage of air past this seal. The outer end of tube 43 is threaded into a well 45 formed in the inner shank end of a cap screw 46 threaded into the outer end of a bore 37 passing centrally through end cap 28. An O-ring or other suitable gasket 49 seals cap screw 46 to cap 28. An annular groove 50 surrounding the shank of cap screw 46 communicates through radial passages with the interior of tube 43. From the foregoing it will be recognized that air tube 43 is removable for inspection and servicing along with end cap 46.

Air flowing in tube 43 passes to or from the axially aligned tube 35 rigidly supported in piston 32. The inner end of tube 35 is provided with radial passages (not shown located close to its connection with sleeve 36 and these passages communicate with passages formed in piston 32 and extend into the annular chamber between the right hand ends of stages 23 and 24. These features are shown in detail in the aforementioned co-pending application of George H. Fuehrer and Wolfrom G. Korff and form no part of the present invention, it merely being pointed out that pressurized air can be supplied to either end of piston 32 depending upon the direction in which it is desired to move this piston and its attached cylinder 24. The left hand end of piston 32, as viewed in FIGURE 1, is provided with a deeply beveled rim edge closely adjacent one side wall of an annular groove 58 having outwardly diverging side walls seating therein a one-piece resilient sealing ring, designated generally 59, having relatively wide annular lips 60, 60. The remotely spaced rims of these lips are in close wiping contact with the interior surface of the first or larger stage 23 of the feed leg. The slightly reduced mid-portion of sealing ring 59 is provided with a shallow but wide groove 61 seating a continuous thin-walled keeper ring 62 of high strength flexible metal effective to lock the sealing ring seated within groove 58. It is pointed out and emphasized that keeper ring 62 is sufficiently smaller in diameter as to be out of contact with the interior of tube 23 and sufficiently larger in diameter than the rim of groove 58 for assembly into groove 61 of the sealing ring after the latter is seated in groove 58. To be observed in particular is the fact that the surfaces of lips 60 closest to the surface being sealed converge toward this surface from their junction with the main body portion 62 of the ring at a very acute angle.

As molded and prior to assembly of the piston relative to the cylinder, it will, of course, be understood that the angle of taper of lips 60 is greater than the assembled angle of taper. In other words, the outer tip ends of lips 60 are of slightly greater diameter than the wall against which they are to seal and for this reason, are required to be pressed inwardly slightly during assembly. In consequence, these bear against the cylinder wall under slight resilient pressure in their normal operating position.

If the ring is to be used to seal against the piston rod or other internal concentric surface, it is contoured as shown in FIGURE 3, the corresponding parts being designated with the same reference numerals distinguished by the addition of a prime. The remote tip surfaces of sealing lips 60' are of slightly smaller diameter than the surface of the piston rod or other cylindrical surfaces against which they are intended to seal. A further feature of the lip design is the back-cutting of radial faces 63 of the lips at an appropriate rake angle, as for example 30 degrees, to provide a sharp leading edge for the lips, as well as providing a thin-walled flexible lip edge, thereby assuring longer service life and more positive sealing action.

Referring now to the righthand end of FIGURE 1, a description will be given of the end ring assemblies and the importance of the dust wiper seals supported in these rings. Secured to the outer end of the first stage tube 23, as by threads 70, is a retainer ring 71. Threads 70 are preferably sealed against leakage as by O-rings 72 retained in inwardly opening annular grooves arranged as is indicated in FIGURE 1. These sealing rings assist in holding retainer ring 71 immovably assembled to tube 23 under severe shock and vibration conditions. The internally shouldered portion 73 of ring 72 mates with the complementally shouldered portion of a bushing ring 74. When ring 71 is properly assembled to tube 23, bushing 74 is held tightly compressed against the tapered surface 75 of tube 23. Bearing bushing 74 has an accurately finished internal diameter having a sliding fit with the exterior of second stage 24.

It will also be understood that the right hand end of stage 24 is provided with an end ring 77 assembled into the internally threaded outer end of stage 24, as is indicated at 78. A bearing sleeve 79 is pressed into or adhesively bonded to a counter sink provided in the inner end of end ring 77 and has a sliding fit with the exterior of third stage 25.

The outer ends of rings 71 and 77 are each provided with inwardly opening annular grooves 81, 82 having diverging side walls complemental to the similarly shaped side walls of main body portions 83, 84 of a pair of unitary similarly shaped dust wiper rings having the same general configuration and design characteristics as described above in connection with ring 59'. In fact, for the purposes of this disclosure the FIGURE 3 sealing ring can be considered as showing the dust wiper ring seated in grooves 81, 82 of the end rings. In view of the identical design characteristics of the gasket ring whether employed as dust wipers on the external ends of the cylinders or as piston rings on the interior of the cylinder assembly, it is thought unnecessary to repeat the description given above.

Although various elastomeric materials and compositions may be employed in forming the sealing ring featured by this invention, it has been found that polyurethane is particularly suitable and provides unusually long and trouble-free service life. Desirably, the shore-hardness of this material for most satisfactory results ranges between a shore of 75 and 80. The relatively thick heavy-bodied central portion of the ring provides an unusually solid and firm mounting anchorage for the ring as well as for each of the oppositely extending thin but wide sealing lips. The unusually wide separation of the lip tips from one another serves important purposes including the provision of an unusually wide sealing surface for the lips. The wide spacing of the actual sealing surfaces aids materially in the self-aligning action of the seal ring, permits the juxtaposed cylindrical surfaces being sealed to provide reinforcing support for the lips and makes possible the pronounced resilient sealing action characteristic of the described ring. Undoubtedly there are numerous factors which contribute very substantially to the long service life of the sealing ring and not presently clearly understood. Irrespective of the explanation, the demonstrable fact is that the sealing ring of this invention provides far greater and trouble-free service life than prior sealing ring design.

While the particular sealing ring assembly and associated parts herein shown and disclosed in detail is fully capable of attaining the object and providing the advantages hereinbefore stated, it is to be understood that it is merely illustrative of the presently preferred embodiments of the invention and that no limitations are intended to the details of construction or design herein shown other than as defined in the appended claims.

I claim:
1. In a fluid pressure actuated cylinder assembly, a one-piece piston having an outer diameter substantially less than the inner diameter of a surrounding cylinder, said piston having one rim edge deeply beveled to provide a pilot surface over which a sealing ring can be expanded to assemble the same into a seating groove, a radially deep and wide annular groove opening outwardly through the peripheral walls of said piston and spaced close to said beveled rim edge, the side walls of said groove diverging outwardly from the bottom of the groove at an acute angle to a plane normal to the piston axis, a one-piece continuous sealing ring member of resilient elastic material capable of being expanded sufficiently for forced assembly over the beveled rim edge of said piston and to then contract into snug-fitting seating engagement with the diverging side walls of said annular groove, said sealing ring being of homogeneous material and having a thick-walled radially-disposed annular main body centrally thereof complemental in shape to the annular groove of said piston, said main body having thin annular tapering resilient sealing lips flaring in opposite generally axial directions from junctions with the outer rims of said main body, the thickest portion of said lips being at their junction with said main body and tapering to a relatively thinner but blunt outer sealing edge, the inner surfaces of said lips being spaced from the underlying peripheral wall of said one-piece piston to permit limited flexing of said lips about their junctions with the main body of the seal without interference from the piston side wall, the outer surfaces of said lips converging toward the seal body at very acute angles with respect to the inner surface of said cylinder and into merger with the opposite edges of a radially shallow but relatively wide groove formed in the outer periphery of said main body between the junctions of said lips therewith.

2. A cylinder assembly as defined in claim 1 characterized in the provision of a continuous metallic retainer ring for said sealing ring, said retainer ring being of substantially greater diameter than the periphery of said piston and being assembled over the beveled rim edge of said piston by deflecting the adjacent one of said seal lips inwardly and forcing said ring thereover and into snug fitting seating engagement with the surfaces of said shallow wide groove, the exterior of said retainer ring being of smaller diameter than the interior surface of said cylinder and being held spaced inwardly therefrom by the underlying main body of said resilient sealing ring.

References Cited in the file of this patent
UNITED STATES PATENTS

| | | |
|---|---|---|
| 2,362,125 | Eves | Nov. 7, 1944 |
| 2,889,183 | Peras | June 2, 1959 |
| 2,903,308 | Barnhard | Sept. 8, 1959 |